US009950781B2

(12) United States Patent
Dittrich et al.

(10) Patent No.: US 9,950,781 B2

(45) Date of Patent: Apr. 24, 2018

(54) EFFECTOR WITH EJECTABLE STEALTH SHELL

(71) Applicant: Airbus Defence and Space GmbH, Ottobrunn (DE)

(72) Inventors: Kay W. Dittrich, Ingolstadt (DE); Juan Perez-Sanchez, Bad Aibling (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 51 days.

(21) Appl. No.: 14/676,047

(22) Filed: Apr. 1, 2015

(65) Prior Publication Data

US 2015/0284068 A1 Oct. 8, 2015

(30) Foreign Application Priority Data

Apr. 2, 2014 (DE) ........................ 10 2014 004 838

(51) Int. Cl.

*B64C 7/00* (2006.01)
*B64D 7/04* (2006.01)
*B64D 7/06* (2006.01)
*G01S 7/38* (2006.01)
*F41H 3/00* (2006.01)
*F41F 3/06* (2006.01)
*B64D 7/02* (2006.01)
*F42B 10/42* (2006.01)

(52) U.S. Cl.

CPC ................. *B64C 7/00* (2013.01); *B64D 7/02* (2013.01); *B64D 7/04* (2013.01); *B64D 7/06* (2013.01); *F41F 3/06* (2013.01); *F41H 3/00* (2013.01); *G01S 7/38* (2013.01); *F42B 10/42* (2013.01)

(58) Field of Classification Search

CPC ..... B64C 7/00; F41H 3/00; B64D 7/06; F42B 10/42

USPC ............................................. 244/137.4, 133

See application file for complete search history.

(56) References Cited

U.S. PATENT DOCUMENTS 2,802,396 A * 8/1957 Montgomery ........... B64D 1/04 102/393
3,838,425 A * 9/1974 Ishimitsu .............. B64D 33/02 244/53 B
4,019,699 A * 4/1977 Wintersdorff ............ B64D 7/00 244/121
5,016,015 A * 5/1991 Novak ...................... B64C 1/38 342/1
5,717,397 A 2/1998 Ruszkowski, Jr.
6,417,795 B1 * 7/2002 Fischer .................. F41G 7/224 342/1
2004/0257260 A1 12/2004 Breenden et al.

FOREIGN PATENT DOCUMENTS

EP 1 375 345 A1 1/2004
WO WO 99/17918 A1 4/1999

* cited by examiner

*Primary Examiner* — Brian M O'Hara
*Assistant Examiner* — Keith L Dixon
(74) *Attorney, Agent, or Firm* — Crowell & Moring LLP

(57) ABSTRACT

An effector for an aircraft has an effector body and a stealth sheath enclosing the effector body at least in part. The stealth shell is attached to the effector body and embodied so as to be separated from the aircraft and from the effector body during flight of the aircraft carrying the effector.

9 Claims, 3 Drawing Sheets

100
101
101
13
13
10
10
14
14
12
12

EFFECTOR WITH EJECTABLE STEALTH SHELL

CROSS-REFERENCE TO RELATED APPLICATIONS

This application claims priority under 35 U.S.C. § 119 to German patent application 10 2014 004 838.1, filed Apr. 2, 2014, the entire disclosure of which is herein expressly incorporated by reference.

FIELD OF THE INVENTION

Exemplary embodiments of the present invention relate to an effector with an ejectable stealth shell for an aircraft, as well as an aircraft with such an effector.

BACKGROUND OF THE INVENTION

In aircraft, low detectability in relation to adversarial sensor systems is gaining increasing importance, particularly in the military sector, but also in civil aviation. The radar backscatter cross-section (RBCS) can be one important characteristic value for the detectability of an aircraft in that it constitutes a measure for the relationship of energy irradiated by a generic radar system to the energy reverberated or reflected back to the radar system. The RBCS depends strongly on the outer geometry of the aircraft. Accordingly, a substantial contribution to the RBCS can result from external loads attached to the aircraft, such as weapons, sensor containers and/or external tanks.

Particularly, the backscattering of an electromagnetic radar wave can be determined by two phenomena. From an electromagnetic perspective, an external load on an aircraft consists of the interaction of a supporting structure, also called a pylon, and the actual external load. A radar wave that strikes the aircraft can be reflected, on the one hand, directly on the external load and/or the pylon and be reflected back to the adversarial radar system, on the other hand, through multiple reflection with other structural components of the aircraft.

In order to reduce the RCBS-increasing effects of external loads, stealth aircraft often have weapons bays and/or payload containers in which weapons and/or other payloads can be carried along on the interior of the aircraft. In aircraft without a stealth geometry, however, such weapons bays and payload containers are usually not present and are also difficult to retrofit.

SUMMARY OF THE INVENTION

Exemplary embodiments of the present invention are directed to a weight-saving and comprehensive camouflage for an external load on an aircraft.

One aspect of the invention relates to an effector for an aircraft. The effector has an effector body and a stealth shell enclosing the effector body at least in part. The stealth shell is attached to the effector body and designed to be separated from the aircraft and from the effector body during flight of the effector-bearing aircraft.

The present invention can be regarded as being based, among other things, on the ideas and insights that are described below. If one wishes to subsequently reduce the RBCS of an aircraft without stealth geometry, the RBCS of the external load itself or of the external load integration can be reduced. The reduction of the RBCS of the external load itself is possible only with extensive effort in the case of more complex loads such as weapons or weapon systems. New developments are generally required for that purpose. Another method for the reduction of the RBCS of external loads can consist in imparting a low radar signature (i.e., a low RBCS) to the geometry in the form of a container in which the external load is carried. Such containers can be embodied as a cladding applied in an aircraft-conforming manner, for instance, or as a weapon container with a low radio-signature shape. However, such low radio-signature weapon containers generally have a large volume, since they are intended to enable as great a variety of different external loads in them as possible for cost-related reasons and the external load should be completely enclosed by the weapon container. Increased wind resistance is also associated with the large volume, especially during transonic and supersonic flight. Furthermore, the weight of the external load increases because the low radio-signature weapon container, just like the external load itself, must be able to withstand the masses and air loads that occur.

By virtue of the inventive attachment of the stealth shell to the effector body, loads resulting from fixed weight or the mass of the stealth shell as well as loads due to flow resistance can be borne and absorbed by the effector body. The stealth shell itself therefore does not necessarily have to be designed so as to be load-bearing, and the effector body can provide a structural stiffening of the effector. The stealth shell can therefore have a relatively light design intended only for transferring transient loads such as air or flow resistance. Overall, a light effector can be provided in this way, thus enabling both production costs and fuel consumption to be reduced. Moreover, the range of the aircrafts can thus be increased.

The aircraft can be a manned aircraft, an unmanned aircraft, an aerial vehicle, an airplane, a drone, a helicopter or a blimp.

The effector body can refer, for example, to a weapon or weapon system mounted in a stationary manner on the aircraft, such as a firearm, a deflection device or another defensive or attack device. The effector body can also refer to an ejectable bomb, a rocket, a guided missile body or a cruise missile body. In principle, the effector body can refer to any payload mounted on the outside of the aircraft, such as a sensor system, a camera system, a fuel tank or a battery pack.

The term "stealth shell" can generally refer to a sheathing of the effector body which encloses the effector body at least in part and is designed to reduce the radar backscatter cross-section (RBCS) of the effector body or to give the effector an overall low radar signature.

The stealth shell can be made, for example, of plastic, carbon fiber-reinforced plastic, glass fiber-reinforced plastic, aluminum, metal or any other suitable material.

According to one embodiment of the invention, the stealth shell is attached in a form-fitting manner to the effector body. For example, the stealth shell can be embodied so as to cooperate with an outer contour of the effector body, so that the stealth shell can be carried by the effector body by means of a positive fit. This can advantageously reduce the weight of the effector. Alternatively or in addition, the stealth shell can also be attached at least in part in a frictionally engaged and/or non-positive manner to the effector body.

According to another embodiment of the invention, the stealth shell has at least one edge running around a direction of longitudinal extension of the effector body. In other words, the stealth shell can be rounded off, round, oval, elliptical or polygonal with respect to a cross-section, for example, whereby it can have a sharp edge and/or outer contour. The stealth shell or an outer surface thereof can also be multiply curved and/or two-dimensionally polygonal, for example. In this way, the RBCS can advantageously be reduced by means of a radar signature-optimized geometry of the effector, since an electromagnetic wave such as a radar signal that strikes the stealth shell can be scattered and/or reflected in several spatial directions.

According to one embodiment of the invention, the stealth shell has an outer surface facing away from the effector body that is electrically conductive and/or has a radar absorber. For example, the outer surface can be outfitted with an electrically conductive surface, whereby any incident radar radiation from an adversarial sensor or receiver can be reflected away. Furthermore, a radar absorber on the outer surface can reduce multiple reflections on the effector. The radar absorber can be mounted either additively on the outer surface—by painting in the form of a radar radiation-absorbing paint, for example—or it can be adhered in place, for example in the form of radar radiation-absorbing camouflage mats. The RBCS of the effector can be further reduced in this manner.

According to another embodiment of the invention, the stealth shell has a radar-absorbing structure. In other words, the stealth shell can consist of a radar-absorbing structure, for example with a radar-absorbing foam as the core of a sandwich structure of the stealth shell. The RBCS can thus be further reduced.

According to one embodiment of the invention, the stealth shell has a plurality of shell elements. For example, the stealth shell can have two, three, four or more shell elements. In this way, the stealth shell, in a manner corresponding to a geometry of the effector body, can be embodied as a specifically shaped set of shell elements that are able to enclose the effector body at least in part. A passage for a supporting structure for the effector arranged on the aircraft, such as a pylon, as well as an access to locking mechanisms of the effector body, such as locking bolts that can be removed before takeoff can be arranged on the stealth shell.

An outer shape or contour of the shell elements can constitute a low radio-signature geometry, which can have an edge running sharply around a direction of longitudinal extension of the effector body. The shell elements can be attached to the effector body before or after its attachment to the aircraft, for example on the pylon. The shell elements can be attached by means of a quick-release fastener directly to the effector body, for example by means of a clip connection, an adhesive connection, a bolt, or an angle. Alternatively or in addition, the shell elements can be attached and/or connected to one another and be attached to the effector body through a positive fit, for example.

Abutting edges of two adjacent shell elements, which can refer to adjacent edges or rims of the shell elements in a direction of longitudinal extension, for example, can be connected, for example adhered, to one another. The shell elements can also be attached and/or locked to one another by means of a suitable locking device. The shell elements can also be connected to one another by means of an angle, for example, it being possible for the angle to be adhered or screwed to the shell elements, for instance.

In the case of a stealth shell with an electrically conductive outer surface, the individual shell elements can be covered or connected to each other by means of an electrically conductive strap or adhesive tape and/or elastic, electrically conductive lips in the area of the abutting edges. The lips and the shell elements themselves can be adhered and/or screwed to one another, for example.

According to another embodiment of the invention, the stealth shell has a separating device embodied so as to separate the stealth shell from the effector body. The stealth shell can be separated from the effector body before or after ejection or separation of the effector body from the aircraft. For example, the separating device can have at least one detonating cord for this purpose running on a side of the stealth shell facing toward the effector body in a direction of longitudinal extension of the effector body. The at least one detonating cord can be arranged, for instance, along an abutting edge of two adjacent shell elements on the inside between effector body and stealth shell. It is also possible for several detonating cords to be arranged on every abutting edge and/or at predetermined breaking points of the stealth shell. It is expedient for the detonating cords to be redundant, i.e., arranged at least in duplicate, in order to ensure safe and reliable separation. Alternatively or in addition, the separating device can have airbag-like air pillows that can be inflated in order to separate the stealth shell from the effector body in an explosive manner. The separating device can also have spring elements which can separate the shell elements and the effector body from each other.

Overall, through the provision of the separating device, it can be ensured that aerodynamic characteristics of the effector body are not influenced by the stealth shell after ejection or ignition thereof. An additional certification and/or qualification of flight characteristics of the effector with stealth shell can also advantageously be omitted. Furthermore, the already existing effector body can be retrofitted with the stealth shell according to the invention in a fast and cost-effective manner.

Additionally, the stealth shell can be made at least in part of a biodegradable plastic, for example of natural fibers, in a matrix of starch-based polymer. In addition, a water-impermeable surface protection can be applied to the outer surface of the stealth shell. During storage and/or during a flight, the stealth shell can be protected from moisture and bacteria in this way. After the ejection of the stealth shell, an unprotected surface of the stealth shell or of the shell elements can be exposed and break down over time. This characteristic of auto-decomposition can be particularly important for peace operation exercises, since the collection of the stealth shell or of the shell elements cannot always be ensured. The additional costs of collection can also be saved.

According to another embodiment of the invention, the stealth shell is made at least in part of a splintering or shattering material. This can ensure a reliable and complete separation of the stealth shell from the effector body. For example, the stealth shell can be made at least in part of a pre-stressed glass that can also have at least one predetermined breaking point. For instance, the glass can be shattered by the separating device, so that the stealth shell can be broken up quickly and completely into small fragments, which can also be harmless to the aircraft itself. The stealth shell can also be made of a shattering plastic.

According to another embodiment of the invention, the stealth shell is made at least in part of a foam-like material. For example, an effector body can be foamed in by separating device and provided with a radar signature-optimized outer contour. The foam can then cure, for example, and the outer surface can be additionally sealed and/or provided with an electrically conductive paint. With the aid of the separating device, the cured foam can then be broken down and/or shattered into several parts and thereby separated from the effector body.

Another aspect of the invention relates to an aircraft with an effector as described above and below. The effector can be hung on a pylon on the outside or on an underside of the aircraft, for example. Furthermore, the effector can be embodied so as to be ejected—released from the pylon, for instance—during a flight. The stealth shell can be separated from the effector body with the aid of the separating device before or after ejection of the effector.

It should be noted that possible features and advantages of embodiments of the invention are described herein with reference to different embodiments of the effector. A person skilled in the art recognizes that the described features can be combined and exchanged in an appropriate manner in order to obtain further embodiments and, as the case may be, synergistic effects.

BRIEF DESCRIPTION OF THE DRAWINGS

Exemplary embodiments of the invention will be elaborated below with reference to the enclosed drawings.

The figures are merely schematic and not true to scale. In principle, identical or similar parts are provided with the same reference symbols.

DETAILED DESCRIPTION

Figure 1A:
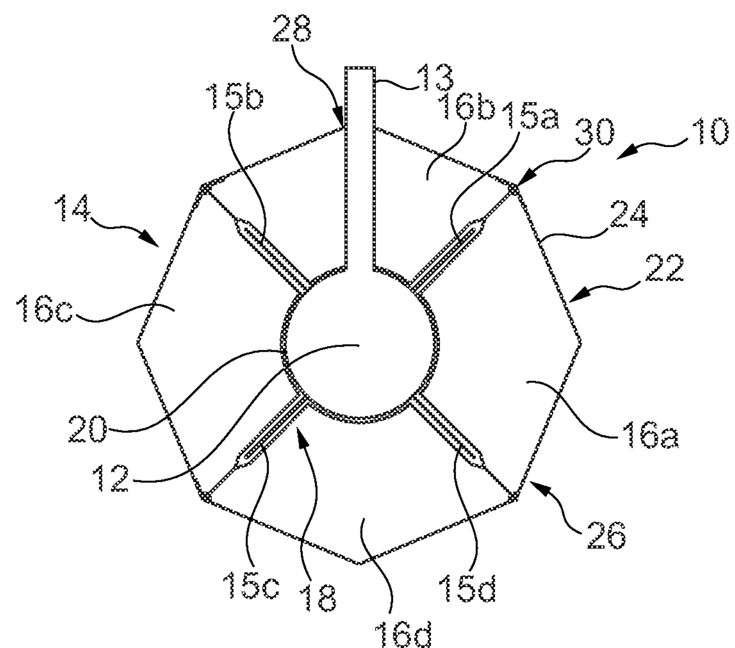
FIG. 1A shows a cross-section of an effector for an aircraft according to one exemplary embodiment.

FIG. 1A shows a cross-section of an effector 10 for an aircraft 100 according to one exemplary embodiment. The effector 10 has an effector body 12. The effector body 12 can refer to a bomb, a rocket, a guided missile body, a fuel tank or an external load for the aircraft 100 in general.

The effector body 12 is attached to a supporting structure 13 which can be a pylon. For example, the effector body 12 can be detachably attached to the outside of an end of the supporting structure 13, and an end of the supporting structure 13 opposite this end can be attached, for example, to a fuselage or a bearing surface of the aircraft 100. The effector body 12 also has four wing-like extensions 15*a*, 15*b*, 15*c*, 15*d* which protrude radially from the effector body 12 in the manner of rays.

Moreover, the effector 10 has a stealth shell 14 enclosing the effector body 12 at least in part and is embodied so as to be separated from the aircraft 100 and from the effector body 12 during a flight.

The stealth shell 14 has a total of four shell elements 16*a*, 16*b*, 16*c*, 16*d*. Each one of the shell elements 16*a*-16*d* is arranged between two of the extensions 15*a*-15*d*. The shell elements 16*a*-16*d* can each have recesses or indentations 18 on each lateral edge of the shell element 16*a*-16*d*, so that the extensions 15*a*-15*b* can each be received between two adjacent shell elements 16*a*-16*d*.

A side 20 of each shell element 16*a*-16*d* facing toward the effector body 12 is embodied to cooperate with an outer contour of the effector body 12 such that the shell elements 16*a*-16*d* enclosing the effector body 12 in a form-fitting manner can be attached thereto through a positive fit. The side 20 can be rounded off for this purpose as shown in FIG. 1A. Alternatively or in addition, the shell elements 16*a*-16*d* can also be attached by quick-release fasteners and/or a locking device to the effector body 12, such as with a clip or snap connection.

Furthermore, the shell elements 16*a*-16*d* can be connected to one another on their abutting edges, i.e., on adjacent lateral edges of two adjacent shell elements 16*a*-16*d*. For example, two respective adjacent shell elements 16*a*-16*d* can be adhered, screwed, welded, locked or otherwise connected to each other.

Each of the shell elements 16*a*-16*d* has an angled outer contour 22 on a side facing away from the effector body 12, so that the stealth shell 14 has a circumferential sharp edge 24 running around a direction of longitudinal extension of the effector body 12 overall, thereby reducing an RBCS of the effector 10 or of the effector body 12. The circumferential edge 24 has a total of eight corners, and the stealth shell 14 is octagonal in a cross-section orthogonal to the direction of longitudinal extension of the effector body 12. Any other cross-sections are conceivable, however, such as polygonal, rounded off, round, oval or elliptic.

Furthermore, the stealth shell 14 has an outer surface 26 facing away from the effector body 12 that can be electrically conductive and/or on which a radar absorber can be arranged. For example, camouflage mats made of radar-absorbing material can be adhered to the outer surface 26.

Moreover, the stealth shell 14 has a passage 28 for passing through the supporting structure 13. For example, the passage 28 can be a recess in at least one shell element 16*a*-16*d*. The stealth shell 14 can also have an access to the effector body 12 that can also be a recess in at least one of the shell elements 16*a*-16*d*. The access can also be closable, for instance, and provided with a flap, for example.

The effector 10 also has a separating device 30 that is embodied so as to separate the stealth shell 14 from the effector body 12 and/or the shell elements 16*a*-16*d* from one another and from the effector body 12, as described in detail in the following figures. For this purpose, a respective separating device 30 can be arranged between two adjacent shell elements 16*a*-16*d*. It is also possible for at least one separating device 30 to be arranged between the effector body 12 and the stealth shell 14.

Figure 1B:
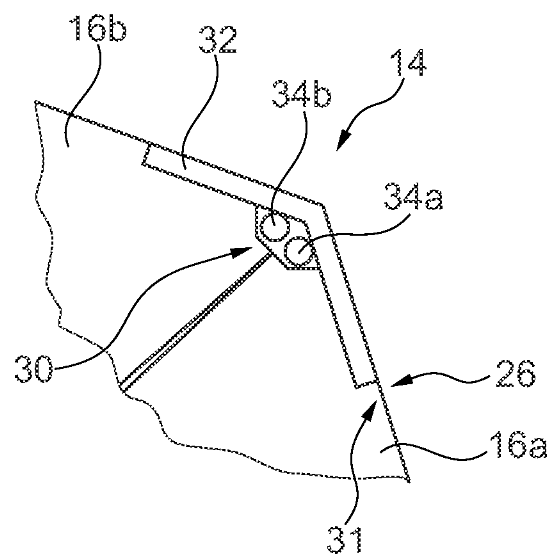
FIG. 1B shows a cross-section through a portion of the effector from FIG. 1A.

FIG. 1B shows a cross-section through a portion of the effector 10 from FIG. 1A. The cross-section of FIG. 1B shows an abutting edge of two adjacent shell elements 16*a*, 16*b*.

The two shell elements 16*a*, 16*b* are connected to one another on the inside with an angle 32 an inner surface 31 opposite the outer surface 26. The angle can be made of plastic, for instance, and screwed and/or adhered to a respective end of a respective shell element 16*a*, 16*b*. Furthermore, the shell elements 16*a*, 16*b* can be connected to one another on the inside with an electrically conductive strap, for example an adhesive tape.

Moreover, FIG. 1B shows the separating device 30 in detail. The separating device 30 has two detonating cords 34*a*, 34*b*, which can be arranged parallel to a direction of longitudinal extension of the effector body 12 and/or of the stealth shell 14. With the aid of the detonating cords 34*a*, 34*b*, the shell elements 16*a*, 16*b* can be separated from each other and from the effector body 12 before or after ejection of the effector 10 from the aircraft 100. For example, the angle 32 can be separated in the middle through ignition of the detonating cords 34*a*, 34*b*, whereby a connection of the shell elements 16*a*, 16*b* provided by the angle 32 can be undone. For this purpose, the angle 32 can also have a predetermined breaking point that can be embodied in the form of a groove and can be broken through ignition of the detonating cords 34*a*, 34*b*. It should be noted that the angle 32 is provided only optionally for the connection of the shell elements 16*a*, 16*b* and that they can also be connected to one other by adhesive tape along, for example. In such a case as well, the connection between the shell elements 16*a*, 16*b* can be separated with the aid of the separating device 30 or of the detonating cords 34*a*, 34*b*.

In principle, two possibilities are conceivable for the ejection of the effector 10 and separation of the stealth shell 14 from the effector body 12 and from the aircraft 100.

For one, the stealth shell 14 can first be ejected or separated from the effector body 12 and then the effector body 12 can be ejected or separated from the aircraft 100. Such a procedure can be advantageous, for example, if the effector body 12 has to be started from a track, as can be the case with various rocket systems. Suitable guides and segmentations of the shell elements 16*a*-16*d* can ensure that the shell elements 16*a*-16*d* can be separated reliably from the effector body 12 and the aircraft 100.

For another, the effector body 12 can be ejected together with the stealth shell 14 the shell elements 16*a*-16*d* can then be separated from the effector body 12 at a sufficiently large safety distance from the aircraft 100. In this case, however, the leaving behavior of the effector body 12 can change as a result of the aerodynamic shape of the stealth shell 14 or of the shell elements 16*a*-16*d*, and it may optionally be necessary to re-evaluate and qualify the aerodynamic characteristics for each effector body 12.

FIGS. 2A, 2B, 2C and 2D each show a snap-shot of an ejection of an effector 10 according to one exemplary embodiment. The ejection sequence is shown here using the example of a joint ejection of the effector body 12 and the stealth shell 14 from an aircraft 100, with only a portion of a bearing surface 101 of the aircraft 100 being shown. Insofar as not described otherwise, the effectors 10 of FIGS. 2A to 2D can have the same features and characteristics as the effectors 10 of FIGS. 1A and 1B.

Figure 2A:
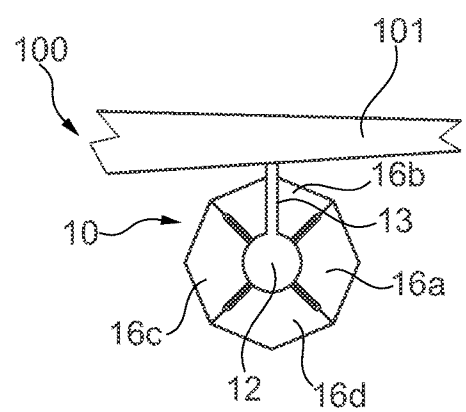
FIGS. 2A to 2D each show a snap-shot of an ejection of an effector according to one exemplary embodiment.

FIG. 2A shows a captive flight of the aircraft 100 in which the effector 10 is attached to the aircraft 100 at an end of the supporting structure 13.

Figure 2B:
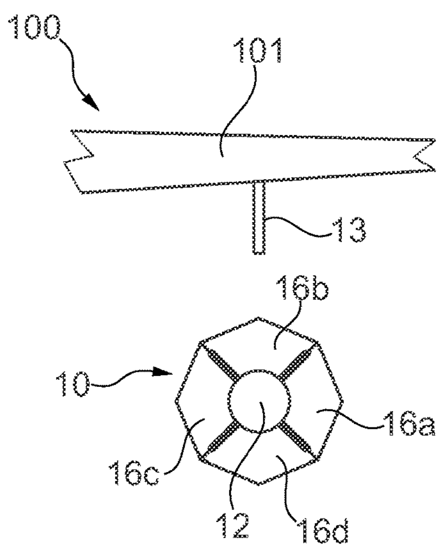

FIG. 2B shows a snap-shot of the ejection of the effector 10, the effector body 12 being separated together with the stealth shell 14 from the aircraft 100 or the supporting structure 13 and moving away from the aircraft 100 as a result of gravitational force or the fixed weight and/or through aerodynamic forces. For this purpose, the effector 10 can be latched from the supporting structure 13, for example. Alternatively or in addition, the effector 10 can also be ejected by means of an ejection device, such as a track system, from the aircraft 100 or the supporting structure 13.

Alternatively, the supporting structure 13 can also be separated from the aircraft 100 and be removed from the aircraft 100 together with the effector 10. In this case, the supporting structure 13 can also be integrally formed with one of the shell elements 16*a*-16*d*. This would also offer the additional advantage that no radar signature contribution of the supporting structure 13 remains on the aircraft 100, but the supporting structure 13 would have to be replaced after every ejection.

Figure 2C:
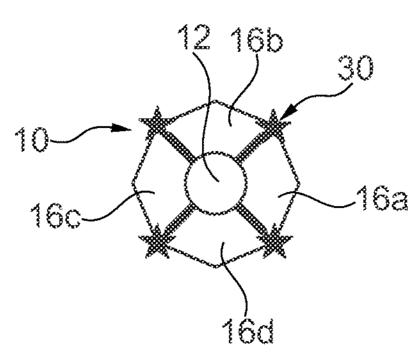
Figure 2D:
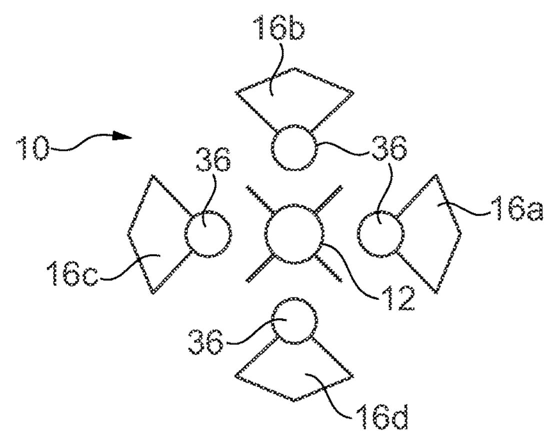

After a sufficiently long freefall phase in order to bring the effector 10 and, optionally, the supporting structure 13 to a safe distance away from the ejecting aircraft 100, the shell elements 16*a*-16*d* are separated from one other with the aid of separating devices 30 and from the effector body 12, as shown in FIG. 2C. For example, the shell elements 16*a*-16*d* can be separated from each other through activation or ignition of the detonating cords 34*a*, 34*b* and/or by opening a locking device between the shell elements 16*a*-16*d*.

The shell elements 16*a*-16*d* and, optionally, the supporting structure 13, if they were ejected together, can subsequently separate from the effector body 12 and fall separately to the ground. This is shown schematically in FIG. 2D. The separation of the shell elements 16*a*-16*d* from the effector body 12 can be supported by additional mechanisms, such as by one or more ejection devices 36, which can be arranged between the shell elements 16*a*-16*d* and the effector body 12. The ejection devices 36 can have spring elements and/or airbag-like air pillows for this purpose, for example, that push apart or separate the shell elements 16*a*-16*d* and the effector body 12 from each other.

In the event of a peace operation exercise, for example, the shell elements 16*a*-16*d* and, optionally, the supporting structure 13, can be additionally equipped with transponders in order to enable recovery and, optionally, reuse.

Parachute packages can also be attached to the shell elements 16*a*-16*d* and, optionally, to the supporting structure 13 that are triggered after separation and can fold up. The reuse of these components can thus be simplified.

Figure 3:
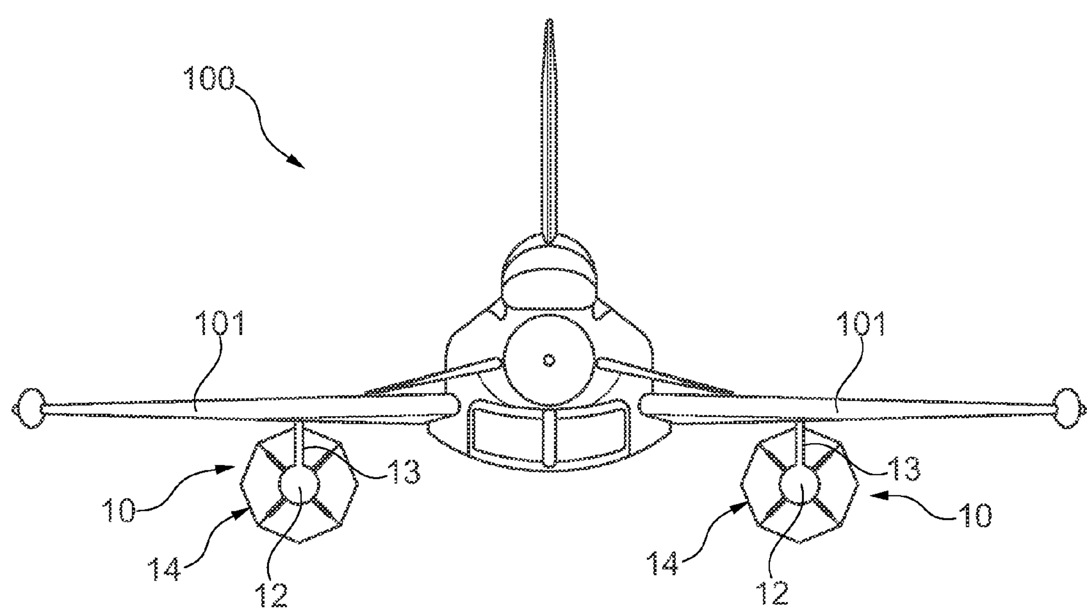
FIG. 3 shows an aircraft with an effector according to one exemplary embodiment.

FIG. 3 shows an aircraft 100 with two effectors 10 according to one exemplary embodiment. The aircraft 100 can be an unmanned or a manned aircraft 100.

The effectors 10 are each arranged on the aircraft 100 on a supporting structure 13 on an underside of a respective bearing surface 101. To reduce the RBCS of the effector body 12 they are each enclosed at least in part by a stealth shell 14.

In addition, it should be pointed out that "comprising" does not exclude any other elements, and "one" or "a" does not exclude a plurality. Furthermore, it should be noted that features that have been described in relation to one of the above exemplary embodiments can also be used in combination with other features of other exemplary embodiments described above. Reference symbols in the claims are not to be regarded as a limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An effector for an aircraft, the effector comprising:

an effector body; and a stealth shell enclosing the effector body at least in part, wherein the stealth shell is attached to the effector body, wherein the stealth shell is configured so as to be separated from the aircraft and from the effector body during flight of the aircraft carrying the effector, wherein the effector body comprises a plurality of wing-like extensions, wherein the stealth shell has a plurality of shell elements each arranged between two of the plurality of wing-like extensions and comprising recesses or indentations on each lateral edge of each respective shell element, such that the plurality of wing-like extensions are receivable between two adjacent ones of the plurality of shell elements, and wherein each of the shell elements has an angled outer contour on a side facing away from the effector body such that the stealth shell has a circumferential edge running around a direction of longitudinal extension of the entire effector body, thereby reducing a radar backscatter cross-section of the effector.

2. The effector of claim 1, wherein the stealth shell is attached in a form-fitting manner to the effector body.

3. The effector of claim 1, wherein the stealth shell has at least one circumferential edge running around a direction of longitudinal extension of the effector body.

4. The effector of claim 1, wherein the stealth shell has an outer surface facing away from the effector body, and the outer surface is electrically conductive or has a radar absorber.

5. The effector of claim 1, wherein the stealth shell has a radar-absorbing structure.

6. The effector of claim 1, wherein the stealth shell has a separating device that is configured so as to separate the stealth shell from the effector body.

7. The effector of claim 1, wherein the stealth shell is made at least in part of a shattering material.

8. The effector of claim 1, wherein the stealth shell is made at least in part of a foam-like material.

9. An aircraft, comprising:

a fuselage wings; and an effector, which comprises an effector body comprising a plurality of wing-like extensions; and a stealth shell enclosing the effector body at least in part, wherein the stealth shell is attached to the effector body, wherein the stealth shell is configured so as to be separated from the aircraft and from the effector body during flight of the aircraft carrying the effector, wherein the stealth shell has a plurality of shell elements each arranged between two of the plurality of wing-like extensions and comprising recesses or indentations on each lateral edge of each respective shell element, such that the plurality of wing-like extensions are receivable between two adjacent ones of the plurality of shell elements, and wherein each of the shell elements has an angled outer contour on a side facing away from the effector body such that the stealth shell has a circumferential edge running around a direction of longitudinal extension of the entire effector body, thereby reducing a radar backscatter cross-section of the effector body.

* * * * *